Figure 1:
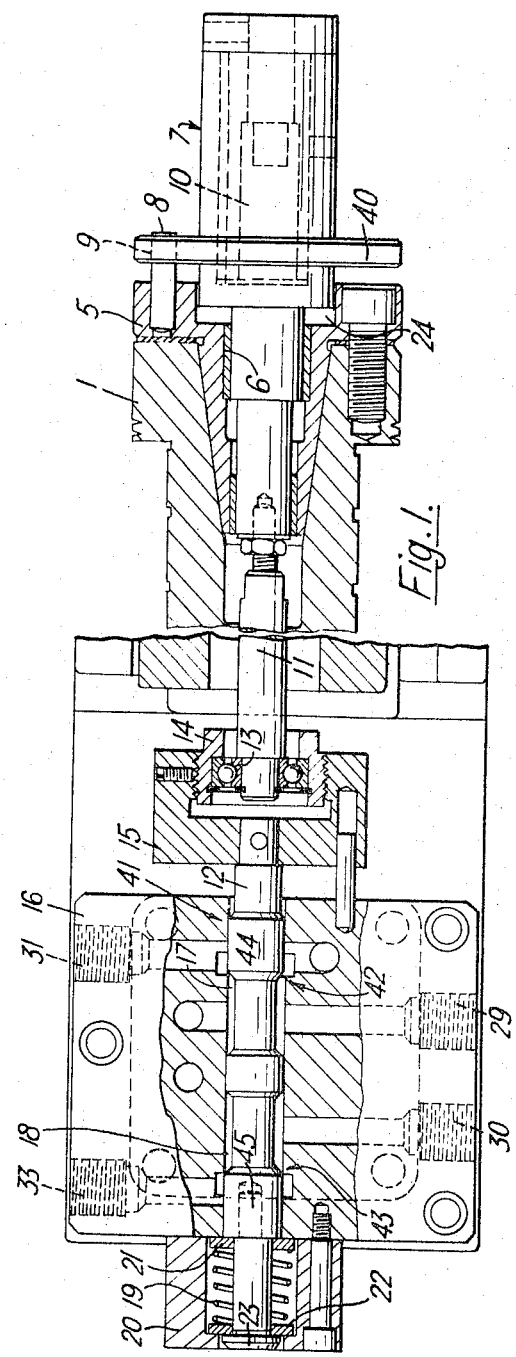

Inventor
JOHN FIRTH
by: Wolfe, Hubbard, Voit & Osann
Attorneys

Inventor
JOHN FIRTH

United States Patent Office 3,336,821
Patented Aug. 22, 1967

3,336,821
CONTROL OF MACHINE TOOLS
John Firth, Arbroath, Scotland, assignor to Giddings & Lewis-Fraser Limited, Arbroath, Scotland, a British company
Filed Oct. 27, 1965, Ser. No. 505,386
Claims priority, application Great Britain, Nov. 3, 1964, 44,741/64
10 Claims. (Cl. 77—32.7)

This invention relates to control of machine tools, especially but not exclusively to a feed control device for a machine tool in which in a first instance the rate of feed is controlled by change in axial pressure on the tool, and in a second instance in which the change from rapid motion to a pre-determined feed rate is controlled by axial pressure on the tool.

The control of the feed rate by axial pressure on the tool applies particularly to tapping operations, and the control of the change from rapid traverse to a pre-determined feed rate applies particularly to operations such as drilling or reaming.

It is customary in tapping operations that the axial feed rate of the tap is derived from a master lead-screw which will move the tap axially at a feed rate determined from the pitch of the tap. Alternatively, the feed rate of the tap is only approximated to the feed rate determined by the pitch of the tap, and the tap is allowed to float axially, to counteract the effect of the approximate feed rate.

With both methods of control the rate of axial feed of the tap must be changed if the pitch of the tap is changed. This is usually a manual operation involving changing of gears in a gearbox, or changing master leadscrews.

Also in the customary methods of tapping, the tap must approach the work and withdraw from the work at the feed rate required by the tapping operation, or, some two speed feed rate device must be used having a means of setting the position of change from rapid feed to the feed rate required by the tapping operation.

If a device is used which controls a change from a rapid feed rate to a feed rate required by the tapping operation, the change from the rapid feed rate must be made at a distance from the workpiece being tapped, such that there is no danger of the tap striking the workpiece whilst moving axially at the rapid feed rate.

All the above customary methods of controlling tapping operations have the disadvantage of requiring skill and time on the part of the person responsible for setting the machine on which the tapping operation is to be carried out.

The object of the present invention is to overcome or mitigate these disadvantages.

According to the present invention there is provided a device for controlling hydraulically operated means for feeding the tool of a machine tool relative to a work piece, comprising a spindle, a tool holder concentric with said spindle and yieldably mounted to the spindle in axial alignment therewith to enable relative axial displacement of the tool holder and spindle, means operated by flow of hydraulic fluid for feeding said spindle and tool holder towards or away from the workpiece, means for throttling the flow of hydraulic fluid to regulate the speed of feed of said feed means upon and in accordance with the extent of relative displacement of the tool holder and spindle, as would occur upon impact with the workpiece of a tool in the tool holder, and valve means included in a line for the flow of hydraulic fluid, the line serving to cause the fluid flow to by-pass the throttling means in the event that the throttling means is closed to fluid flow, the valve means providing a predetermined rate of fluid flow thus to provide a predetermined speed of feed.

Preferably the throttling means comprises throttle-valves comprising two tapered plungers connected to the tool holder and within hollowed portions of a valve body arranged to move linearly with the spindle, said hollowed portions being in fluid connection with the feed means such that one of the throttle valves throttles the supply of fluid to said means, while the other throttles the exhaust of fluid from said means.

Preferably both the throttle valves are open to allow fluid flow therethrough when the tool holder is in a predetermined axially spaced position relative to the spindle.

Preferably resilient means between the valve body and the tool holder tends to maintain the tool holder in its predetermined axially spaced position relative to the spindle.

Preferably said resilient means comprises a compression spring acting between two abutments slidably mounted on the tool holder and being limited in relative movement away from each other by two projections on the tool holder.

Preferably said throttle valves comprise opposite facing, coaxial, frusto-conical enlargements on the tool holder, capable of axial movement with the tool holder towards or away from circular co-axial seating holes leading to the hollowed portions of the valve body, to provide a passage for fluid flow between the frustro-conical enlargements and the valve body.

Preferably movement of the tool holder relative to the spindle out of their predetermined relative positions causes one of other of the throttle valves to adjust the supply or exhaust of fluid to or from the feed means such that the spindle is caused to return to the predetermined position relative to the tool holder by said feed means.

Preferably said valve means comprises a manually regulated restrictor valve for controlling fluid flow by-passing the throttling means.

Preferably a check valve, permitting flow of fluid in only one direction is connected in parallel across the restrictor valve to by-pass the restrictor valve if desired.

Preferably the restrictor valve and check valve are incorporated in the line exhausting fluid from the feed means when said means is causing the spindle assembly to advance towards the workpiece.

Figure 2:
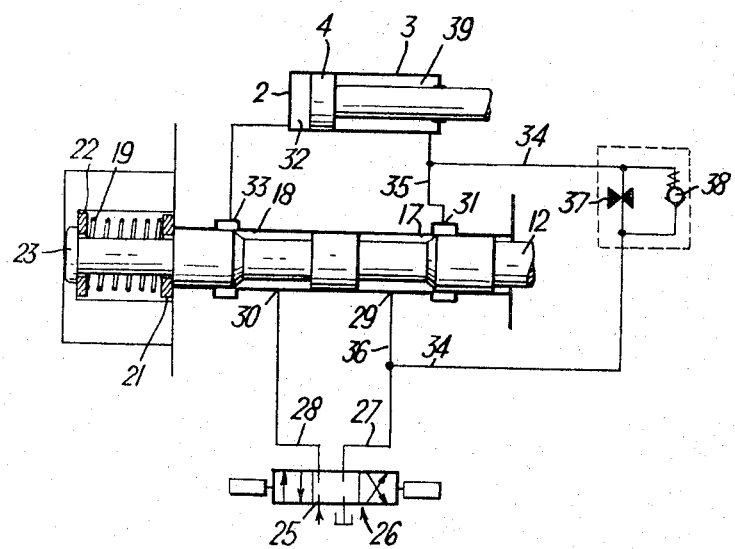

One embodiment of the present invention will now be described with reference to the accompanying drawings in which:

FIGURE 1 shows a sectional elevation of the device,
FIG. 2 shows a diagrammatic view of the hydraulic system for the device.

In the embodiment a spindle 1 rotatable in bearings (not shown), can be traversed in an axial direction by an hydraulically operated feeding assembly 2, for example an hydraulic cylinder 3 and piston 4 assembly.

At the working end of the spindle 1, a sleeve 5, which has a bore 6 into which is slidably mounted a tool holder 7, mounts into the spindle 1. Two pins 8, only one of which is shown, secured in the sleeve 5 mate with holes 9 in the tool holder 7 so that when the spindle 1 is rotated, the tool holder is also rotated, but is still free to slide axially relative to the spindle. A tool holding sleeve 10, which can carry drills or taps, fits into the tool holder 7.

A rod 11 connects the tool holder 7 to a valve spool 12 of throttling means by means of a ball bearing 13, screwed housing 14 and a nut 15. A valve body 16 through which the valve spool extends, is secured to the housing for the spindle 1 so that any axial movement of the spindle is also imparted to the valve body and is provided with two throttle valves (42, 43).

The valve spool 12 is provided with two protrusions (44, 45) such that, when assembled into the valve body 16, fluid passages 17, 18 between the protrusions 44, 45 and body are formed of approximately equal cross-sectional area. A centralising spring 19 mounted in a housing 20 secured to the end of the valve body 16, keeps the valve spool 12 normally in the above position by means of two thrust washers 21, 22 and a stud 23, said stud being screwed into the free end of valve spool 12.

With the valve spool 12 in this position the tool holder 7 is held in a position to allow a gap 24 between the tool holder 7 and the sleeve 5. This gap must be greater than the movement required to completely close the first fluid passage 17 in the valve and spool assembly adjacent the ball bearing 13.

Working fluid is circulated through the apparatus by some external hydraulic pump (not shown) and is brought to one port 25 of standard directional valve 26 which can be any type of valve to give advance or return motion to a piston and cylinder assembly or a hydraulic motor etc.

The output connections 27, 28 from the directional valve 26 are connected to two ports 29, 30 respectively, each leading to a fluid passage in the valve body 16. A first port 31 of the valve body 16, in fluid communication with the first fluid passage 17, is connected to the return side of the feeding assembly 2 and a second port 33 of the valve body 16, in fluid communication with a second fluid passage 18, remote from the ball bearing 13, is connected to the advance side of the feeding assembly 2.

In the connecting fluid line 35 between the first port 31 and feeding assembly 2 an interconnection is made and a fluid line 34 is provided to by-pass the first fluid passage 17 and to connect into the fluid line 36 between the directional valve 26 and the port 29 on valve body 16 in fluid communication with the first passage 17. In this line 34 is a flow restrictor valve 37 which has variable settings to control the flow of fluid through the valve. In parallel with the flow restrictor 37 is a check valve 38 which allows fluid flow only in the direction from the directional valve 26 to the feeding assembly 2.

In operation the above described apparatus may be used for either drilling or tapping operations.

To tap a thread in a hole pre-drilled to the appropriate size in the workpiece a tap is mounted in the tool holding sleeve 10, the restrictor valve 37 is closed and the directional valve 26 is adjusted to cause the spindle assembly to move towards the workpiece. The valve spool 12 is held in its normal position that is, where the area of the first fluid passage 17 is approximately equal to the area of the second fluid passage 18.

The fluid from the directional valve 26 flows through the port 30 associated with the second fluid passage 18, and said second passage 18 through to the advance side 32 of the feeding assembly 2. The whole spindle assembly moves forward at a "rapid advance" speed. Fluid from the "return" side 39 of the piston 4 is discharged through the port 31 associated with the first fluid passage 17, through said first passage 17 and returns to the directional valve 26 by way of the line 36.

When the tap strikes the previously drilled hole in the workpiece, it starts to cut under the compressive influence of the spring 19 in the housing 20 on the valve body 16. The spring 19 must be of a strength to start the tap.

The axial advance rate of the tap and tool holder 7 is now determined by the penetration rate of the tap, and as the rate of forward movement of the spindle assembly is greater than the penetration rate of the tap, a relative movement will take place between the valve spool 12 and valve body 16 such that the first fluid passage 17 in the valve body decreases in area to control the speed of the spindle advance to that dictated by the speed of tap penetration. The only axial load on the tap will be that caused by the spring 19.

When the tap has reached its maximum depth (determined by external means) the direction of rotation of the spindle is changed at the same time as directional valve 26 is changed over to cause a change in axial motion of the spindle 1.

Fluid will then flow from the directional valve 26 to the port 29 associated with the first fluid passage 17 but as said passage 17 is still closed, fluid cannot flow through the valve body 16. Fluid can, however, flow from the directional valve 26 via the line 34 and the check valve 38 to the return side 39 of the feeding assembly 2. The spindle assembly will now move in the return direction, and fluid from the advance side 32 of feeding assembly will flow through the second fluid passage 18 and to the directional valve 26.

The spindle assembly thus starts the return movement at rapid traverse speed until relative movement of the valve spool 12 and the valve body 16 cause the area of the second fluid passage 18 to decrease sufficiently to cause the speed of return of spindle movement to be the same as the speed of return of the tap. The only axial load on the tap will be that caused by the spring 19.

Return motion will continue as above until the tap clears the workpiece. As soon as this happens, the valve spool 12 will return to its normal position under the influence of the spring 19 and the spindle assembly will return to its starting point at rapid traverse rate.

To drill a hole in a workpiece using the apparatus a drill hole is fitted in the tool holding sleeve 10 of the tool holder 7, the restrictor valve 37 is adjusted to give a desired rate of flow of fluid through said valve and the directional valve 26 is adjusted to cause the spindle assembly to move towards the workpiece at the rapid advance speed as above described. The spindle assembly moves forward until the drill strikes the workpiece. When this happens, the drill, tool holder 7, rod 11 and valve spool 12 will stop their forward movement. The spindle assembly will still advance and cause relative axial motion between the valve spool 12 and the valve body 16 and the first fluid passage 17 will be closed. The spindle assembly will now advance at a rate dictated by the flow of fluid through the flow restrictor 37, and the gap 24 between the flange 40 of the tool holder 7 and the spindle 1 will close. The spindle 1 will continue to move forward and feed the drill into the workpiece. When the required limit of travel of the drill has been reached (determined by some exterior means, for example limit switches) the directional valve 26 will operate to reverse the flow of fluid.

The sequence of events following this reversal of flow will be identical to that which occurs during a tapping operation but since there is no resistance to axial movement of the drill in the return direction there will be no tendency for the second fluid passage 18 to close and the drill and spindle 1 will continue at the rapid return rate. When the spindle 1 reaches its maximum return position, determined by external means, the directional valve 26 will be reset to stop spindle assembly movement. The complete assembly is now set for another cycle.

It will be realised that the embodiment hereinbefore described is only one example of the invention and several modifications to the basic apparatus are possible. For example, in one modification adjustment of the spring 19 can be achieved so that the spring load can be varied to suit different sizes of taps. In another modification a two way open or closed valve is placed in series fluid communication with the restrictor valve 37 such that flow through the restrictor valve can be stopped without distributing the valve setting. A tap holder having a friction torque transmission device which can be set to the torque requirements of the different sizes of taps could be incorporated in the tool holder 7, and the sliding parts of the tool holder could be mounted on anti-friction bearings to reduce spring load requirements on the spring 19.

I claim:

1. A device for controlling hydraulically operated means for feeding the tool of a machine tool relative to a workpiece, comprising a spindle, a tool holder concentric with said spindle and yieldably mounted to the spindle in axial alignment therewith to enable relative axial displacement of the tool holder and spindle, means operated by flow of hydraulic fluid for feeding said spindle and tool holder towards or away from the workpiece, means for throttling the flow of hydraulic fluid to regulate the speed of feed of said feed means upon and in accordance with the extent of relative displacement of the tool holder and spindle, as would occur upon impact with the workpiece of a tool in the tool holder, and valve means included in a line for the flow of hydraulic fluid, the line serving to cause the fluid flow to by-pass the throttling means in the event that the throttling means is closed to fluid flow, the valve means providing a predetermined rate of fluid flow thus to provide a predetermined speed of feed.

2. A device as claimed in claim 1, in which the throttling means comprises throttle valves comprising two tapered plungers connected to the tool holder and within hollowed portions of a valve body arranged to move linearly with the spindle, said hollowed portions being in fluid connection with the feed means such that one of the throttle valves throttles the supply of fluid to said means, while the other throttles the exhaust of fluid from said means.

3. A device as claimed in claim 2, in which both the throttle valves are open to allow fluid flow therethrough when the tool holder is in a predetermined axially spaced position relative to the spindle.

4. A device as claimed in claim 2, in which resilient means between the valve body and the tool holder tends to maintain the tool holder in its predetermined axially spaced position relative to the spindle.

5. A device as claimed in claim 4, in which said resilient means comprises a compression spring acting between two abutments slidably mounted on the tool holder and being limited in relative movement away from each other by two projections on the tool holder.

6. A device as claimed in claim 2, in which said throttle valves comprise opposite facing, co-axial, frustro-conical enlargements on the tool holder, capable of axial movement with the tool holder towards or away from circular co-axial seating holes leading to the hollowed portions of the valve body, to provide a passage for fluid flow between the frustro-conical enlargements and the valve body.

7. A device as claimed in claim 2, in which movement of the tool holder relative to the spindle out of their predetermined relative positions causes one or other of the throttle valves to adjust the supply or exhaust of fluid to or from the feed means such that the spindle is caused to return to the predetermined position relative to the tool holder by said feed means.

8. A device as claimed in claim 1, in which said valve means comprises a manually regulated restrictor valve for controlling fluid flow by-passing the throttling means.

9. A device as claimed in claim 8, in which a check valve, permitting flow of fluid in only one direction is connected in parallel across the restrictor valve to by-pass the restrictor valve if desired.

10. A device as claimed in claim 9, in which the restrictor valve and check valve are incorporated in the line exhausting fluid from the feed means when said means is causing the spindle assembly to advance towards the workpiece.

References Cited

UNITED STATES PATENTS 3,273,182    9/1966    McDonald _____ 10—139

FRANCIS S. HUSAR, *Primary Examiner.*